(12) United States Patent
Khawer

(10) Patent No.: US 9,794,935 B2
(45) Date of Patent: Oct. 17, 2017

(54) ADAPTIVE SUBFRAME PUNCTURING FOR CARRIER SENSING ADAPTIVE TRANSMISSION

(71) Applicant: Alcatel-Lucent USA Inc., Murray Hill, NJ (US)

(72) Inventor: Mohammad R. Khawer, Lake Hopatcong, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 262 days.

(21) Appl. No.: 14/686,080

(22) Filed: Apr. 14, 2015

(65) Prior Publication Data

US 2016/0309463 A1  Oct. 20, 2016

(51) Int. Cl.
| | |
|---|---|
| *H04W 72/04* | (2009.01) |
| *H04W 74/08* | (2009.01) |
| *H04W 24/08* | (2009.01) |
| *H04W 28/24* | (2009.01) |

(52) U.S. Cl.
CPC ....... *H04W 72/0446* (2013.01); *H04W 24/08* (2013.01); *H04W 74/0808* (2013.01); *H04W 28/24* (2013.01)

(58) Field of Classification Search
None
See application file for complete search history.

(56) References Cited

U.S. PATENT DOCUMENTS

| | | | | |
|---|---|---|---|---|
| 9,549,326 B2* | 1/2017 | Wei | ........................ | H04W 16/14 |
| 2013/0208587 A1* | 8/2013 | Bala | ...................... | H04W 16/14 |
| | | | | 370/230 |
| 2014/0341018 A1 | 11/2014 | Bhushan | | |
| 2015/0163825 A1* | 6/2015 | Sadek | ................ | H04W 74/0808 |
| | | | | 370/329 |
| 2015/0319701 A1* | 11/2015 | Ng | .......................... | H04L 5/005 |
| | | | | 370/311 |
| 2016/0128084 A1* | 5/2016 | Novlan | .............. | H04W 72/1268 |
| | | | | 370/329 |
| 2017/0048889 A1* | 2/2017 | Kadous | ............. | H04W 72/0446 |

FOREIGN PATENT DOCUMENTS

| | | |
|---|---|---|
| WO | 2013/006988 | 1/2013 |
| WO | 2013/112983 | 8/2013 |

OTHER PUBLICATIONS

International Search Report and Written Opinion correlating to PCT/US2016/026811 dated Jun. 28, 2016 15 pages.
Alcatel-Lucent Shanghai Bell, et al., "Consinderations on LBT Enhancements for Licensed-Assisted Access", 3GPP TSG RAN WG1 Meeting #78bis, Oct. 5, 2014, 6 pages.

* cited by examiner

*Primary Examiner* — Benjamin Lamont
(74) *Attorney, Agent, or Firm* — Davidson Sheehan LLP

(57) ABSTRACT

A node in a wireless communication system includes a transceiver that operates according to a first radio access technology (RAT). The transceiver is to measure a medium usage by one or more other nodes that operate according to a second RAT. The transceiver alternately transmits in a first time interval and bypasses transmission in a second time interval. The first and second time intervals repeat with a duty cycle. The transceiver is to puncture the first time interval with one or more silent gaps. The node also includes a processor to determine a duration of the one or more silent gaps is based on the medium usage.

20 Claims, 6 Drawing Sheets

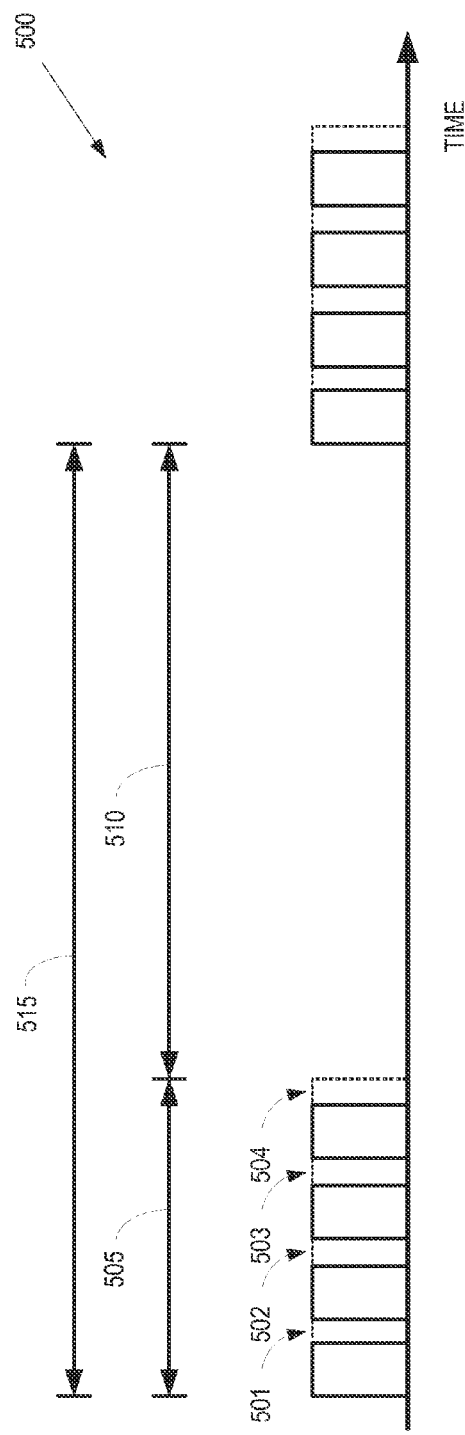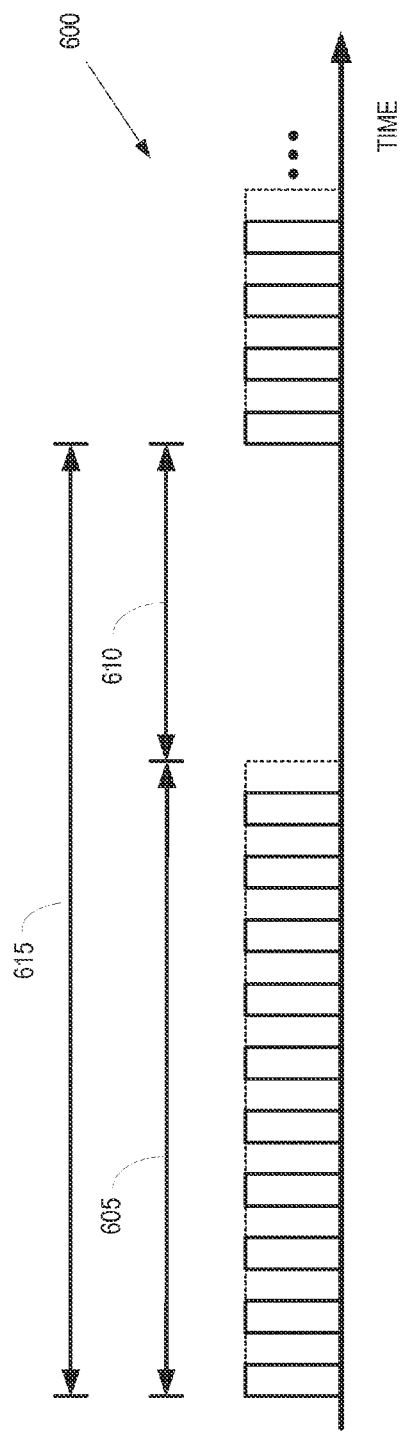

ADAPTIVE SUBFRAME PUNCTURING FOR CARRIER SENSING ADAPTIVE TRANSMISSION

BACKGROUND

Field of the Disclosure

The present disclosure relates generally to wireless communication systems and, more particularly, to transmissions in unlicensed frequency bands of wireless communication systems

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum or base stations that operate in licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. In some cases, base stations may also support uplink communication in the unlicensed spectrum.

Nodes that share the unlicensed frequency band should coordinate their transmissions so that the available resources of the unlicensed frequency band are fairly shared among the different nodes. For example, base stations typically perform carrier sensing to select channels for downlink transmission in unlicensed frequency bands. For example, a base station may measure energy received in channels in the unlicensed frequency bands to identify a "clear" channel. A channel may be considered clear an average of the received energy from other LTE base stations or Wi-Fi access points on the channel is below a threshold value. The base station may then use the clean channel for downlink transmissions. If the base station is unable to identify a clean channel, the base station has to share the channel with one or more other transmitting nodes.

In countries such as the U.S. that do not mandate Listen-Before-Talk (LBT) regulations for operation in the unlicensed spectrum, the LTE base-station may employ a transmission cycle with appropriate duty cycle for ON/OFF period to co-exist on shared channels with Wi-Fi and other LTE base-stations on the same channel of the unlicensed spectrum. An LTE base station may share a channel in the unlicensed frequency band with one or more access points by transmitting signals on the channel for a predetermined time interval (ON) and bypassing transmissions during a subsequent time interval (OFF). For example, the ON interval is typically a multiple of 40 milliseconds (ms) so the ON interval may be 40 ms, 80 ms, 120 ms, or longer. The duty cycle for the ON/OFF time intervals is determined by the number of devices that are sharing the channel. For example, the base station may transmit during a 40 ms ON interval and then bypass transmissions for an 80 ms OFF interval if it is sharing the channel with two Wi-Fi access points.

The extended ON interval used by LTE base stations can cause performance degradation for delay sensitive Wi-Fi applications. For example, voice applications may suffer a noticeable reduction in sound quality if the corresponding Wi-Fi application is unable to transmit during a periodically repeating 40 ms time interval. The performance degradation increases if the ON interval is increased to 80 ms, 120 ms, or longer. Wireless communication systems that implement Listen-Before-Talk (LBT) protocols address this issue by requiring transmitting nodes to listen for a free channel before acquiring the channel for transmission. The maximum channel occupancy is limited to 4 ms in Japan and 10 ms in Europe, so that delay sensitive applications do not have to wait for extended time intervals before acquiring a free channel. However, LBT standards have not been implemented in all countries and implementing the LBT standards will require changes to the existing LTE waveform, which may delay adoption of the LBT standards for a few years.

SUMMARY OF EMBODIMENTS

The following presents a summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In some embodiments, a method is provided for puncturing time intervals used for carrier sensing adaptive transmission. The method includes measuring, at a first node that operates according to a first radio access technology (RAT), a medium usage by one or more second nodes that operate according to a second RAT. The first node alternately transmits in a first time interval and bypasses transmission in a second time interval. The first and second time intervals repeat with a duty cycle. The method also includes puncturing the first time interval with one or more silent gaps. A duration of the one or more silent gaps is determined based on the medium usage.

In some embodiments, an apparatus is provided for puncturing time intervals used for carrier sensing adaptive transmission. The apparatus includes a transceiver that operates according to a first radio access technology (RAT). The transceiver is to measure a medium usage by one or more nodes that operate according to a second RAT. The transceiver alternately transmits in a first time interval and bypasses transmission in a second time interval. The first and second time intervals repeat with a duty cycle. The transceiver is to puncture the first time interval with one or more silent gaps. The apparatus also includes a processor to determine a duration of the one or more silent gaps is based on the medium usage.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

FIG. 5 is a diagram showing allocation of silent gaps in time intervals for downlink transmissions by a node on a channel of an unlicensed frequency band according to some embodiments.

FIG. 6 is a diagram showing allocation of silent gaps that equally partition time intervals for downlink transmissions by a node on a channel of an unlicensed frequency band according to some embodiments.

DETAILED DESCRIPTION

Unlicensed frequency bands can be fairly shared between nodes that operate according to different radio access technologies (RATs) and support delay-sensitive applications without performance degradation by puncturing the time intervals reserved for transmissions on a channel of the unlicensed frequency band by first nodes that operate according to a first RAT with silent gaps to allow transmission by second nodes that operate according to a second RAT. The first node bypasses transmission during the silent gaps. The duration of the silent gaps is determined based on measurements of medium usage by the second nodes. The first RAT may be LTE-U and the second RAT may be Wi-Fi.

Some embodiments of the first node can determine a duty cycle for an ON interval for transmission on the channel based on a number of second nodes that share the channel. For example, the percentage of the duty cycle allocated to the ON interval may be set to 50% if the first node shares the channel with one node and 33% if the first node shares the channel with two second nodes. Some embodiments of the first node determine the duration of the silent gaps by comparing the measured medium usage to one or more threshold values. For example, the silent gaps may include one silent subframe for every 10 subframes in the ON interval if the medium usage is less than a first threshold. The silent gap may include three silent subframes per 10 subframes if the medium usage is above the first threshold but below a second threshold. The silent gaps may be increased to four subframes per eight subframes if the medium usage is above the second threshold. In some embodiments, the duration of the ON interval is increased in response to the medium usage being above the second threshold to preserve fairness between the first and second nodes.

Figure 1:
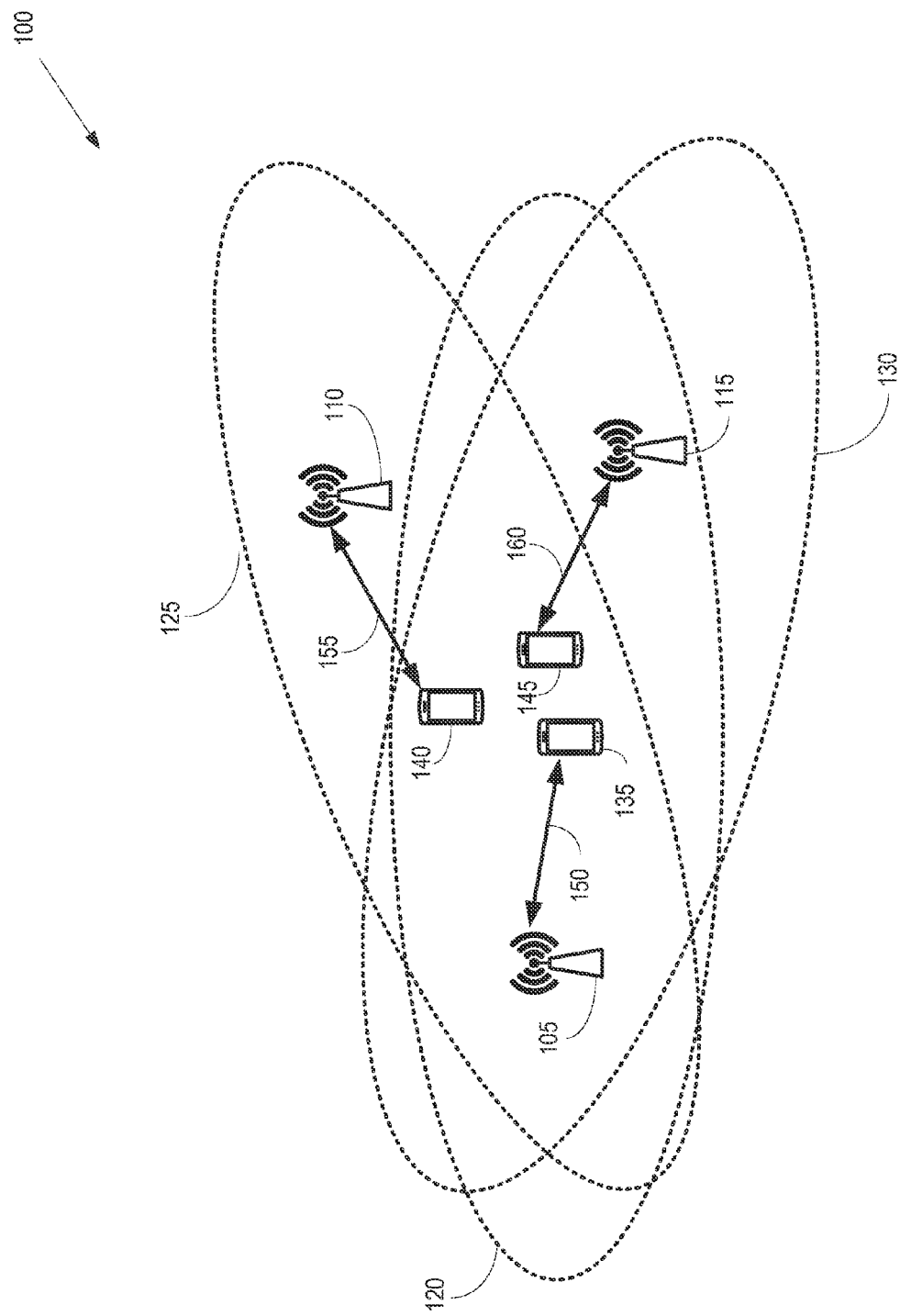
FIG. 1 is a diagram of a wireless communication system according to some embodiments.

FIG. 1 is a diagram of a wireless communication system 100 according to some embodiments. The wireless communication system 100 includes a plurality of nodes 105, 110, 115 that operate according to different RATs. In the illustrated embodiment, the node 105 is a base station (and hence also referred to herein as "base station 105") that operates according to a first RAT such as the LTE standards defined by the 3GPP. The base station 105 provides wireless connectivity within a corresponding geographic area or cell 120. The nodes 110, 115 are access points (and hence also referred to herein as "access points 110, 115") that operate according to a second (different) RAT such as the Wi-Fi standards defined by one or more IEEE 802.11 standards. The access points provide wireless connectivity within corresponding geographic areas or cells 125, 130.

The nodes 105, 110, 115 may be configured to communicate with one or more user equipment 135, 140, 145 over corresponding air interfaces 150, 155, 160. Information may be transmitted between the nodes 105, 110, 115 and the user equipment 135, 140, 145 over channels in licensed frequency bands or unlicensed frequency bands. As used herein, the phrase "unlicensed frequency band" will be understood to refer to a portion of the radiofrequency spectrum that does not require a license for use and may therefore be used by any of the nodes 105, 110, 115 or the user equipment 135, 140, 145 to transmit or receive radiofrequency signals. For example, the Unlicensed National Information Infrastructure (UNII) includes portions of the radio spectrum in frequency bands that range from 5.15 GHz to 5.825 GHz. For another example, the industrial, scientific, and medical (ISM) radio bands are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. As used herein, the phrase "licensed frequency band" will be understood to refer to a portion of the radiofrequency spectrum that is licensed to a particular service provider or providers and may only be used for wireless communication by the nodes 105, 110, 115 or the user equipment 135, 140, 145 that are authorized by the service provider. For example, the United States Federal Communication Commission (FCC) licenses the frequency bands 698-704 MHz and 728-734 MHz to Verizon Wireless and the frequency bands 710-716 MHz and 740-746 MHz to AT&T.

The unlicensed frequency bands support a plurality of channels that may be used for uplink or downlink transmissions between the nodes 105, 110, 115 and the user equipment 135, 140, 145. For example, the 5 GHz unlicensed frequency band allocated to the UNII may be divided into a predetermined number of 20 MHz channels. Some embodiments of the node 105 may use the channels in the unlicensed frequency band to supplement downlink transmissions over channels of a licensed frequency band. For example, a base station 105 that operates according to LTE may transmit best effort data on a supplemental downlink channel in the unlicensed frequency band concurrently with transmitting data, control information, or other critical information on a channel of the licensed frequency band. Some embodiments of the nodes 110, 115 may use the channels in the unlicensed frequency band to support local area wireless radio access technologies (RATs) such as Wi-Fi or other communications according to the Institute of Electrical and Electronics Engineers (IEEE) 802.11 standards.

The nodes 105, 110, 115 may use a channel selection algorithm to choose one or more of the unlicensed frequency band channels for uplink or downlink transmission. Some embodiments of the nodes 105, 110, 115 may select unlicensed channels based on measurements of energy received over one or more of the channels for a predetermined time interval (e.g., long-term energy detection), detection of preambles such as Wi-Fi preambles received over the channels, detection of overhead broadcast channels from neighboring nodes, and the like. For example, the node 105 may monitor channels (or sense) the channels in the unlicensed frequency band to detect one or more clear channels for transmission. As used herein, the term "clear" refers to a channel that is not being used for transmission by any other nodes within range of the node that detects the clear channel. A channel may be identified as a clear channel if the energy received over the channel in the predetermined time interval is less than a threshold value. Nodes that are unable to locate a clear channel for transmission can share an occupied channel with one or more other nodes. For example, the node 105 can share a channel of an unlicensed frequency band with one or more of the nodes 110, 115.

The nodes 105, 110, 115 may select or negotiate time intervals for downlink transmissions over shared channels in the unlicensed frequency band. Some embodiments of the nodes 105, 110, 115 use different time division multiplexed portions of the shared channel for downlink transmissions over the corresponding air interfaces 150, 155, 160. The time division multiplexed portions may repeat over a duty cycle that includes a number of subframes or time intervals, such as subframes that each have a duration of one millisecond. The duty cycle and the portions of the duty cycle that are allocated to each of the nodes 105, 110, 115 may be determined based on the number of nodes that are sharing the channel. For example, if the nodes 105, 110, 115 are sharing the same channel in the unlicensed frequency band, the node 105 may be allocated ⅓ or 33% of the duty cycle for downlink transmissions and the node 105 may bypass transmissions during the remaining ⅔ (or 67%) so that the nodes 110, 115 can transmit downlink signals with minimal interference from the node 105. In some embodiments, the node 105 acquires the channel for 40 ms or a multiple thereof, which may be referred to as an ON interval. The duty cycle for downlink transmissions may therefore be 120 ms when the nodes 105, 110, 115 are sharing the channel. The node 105 bypasses downlink transmissions during the remaining 80 ms of the duty cycle, which may be referred to as an OFF interval.

As discussed herein, the extended ON interval used by the node 105 can cause performance degradation for the nodes 110, 115, particularly if the nodes 110, 115 implement delay sensitive applications. The node 105 may therefore bypass transmission during additional "silent gaps" in the ON interval if the node 105 detects sufficiently high medium usage that indicates that the nodes 110, 115 are attempting to transmit downlink signals over the air interfaces 155, 160. Some embodiments of the node 105 measure a medium usage by the nodes 110, 115. For example, an LTE base station 105 may include a Wi-Fi module to monitor downlink signals transmitted by Wi-Fi access points 110, 115 in the unlicensed frequency bands. The node 105 punctures the ON interval by bypassing transmission during one or more silent gaps in the ON interval if the measured medium usage is sufficiently high. The node 105 adaptively determines the duration of the silent gaps based on the measured medium usage.

Figure 2:
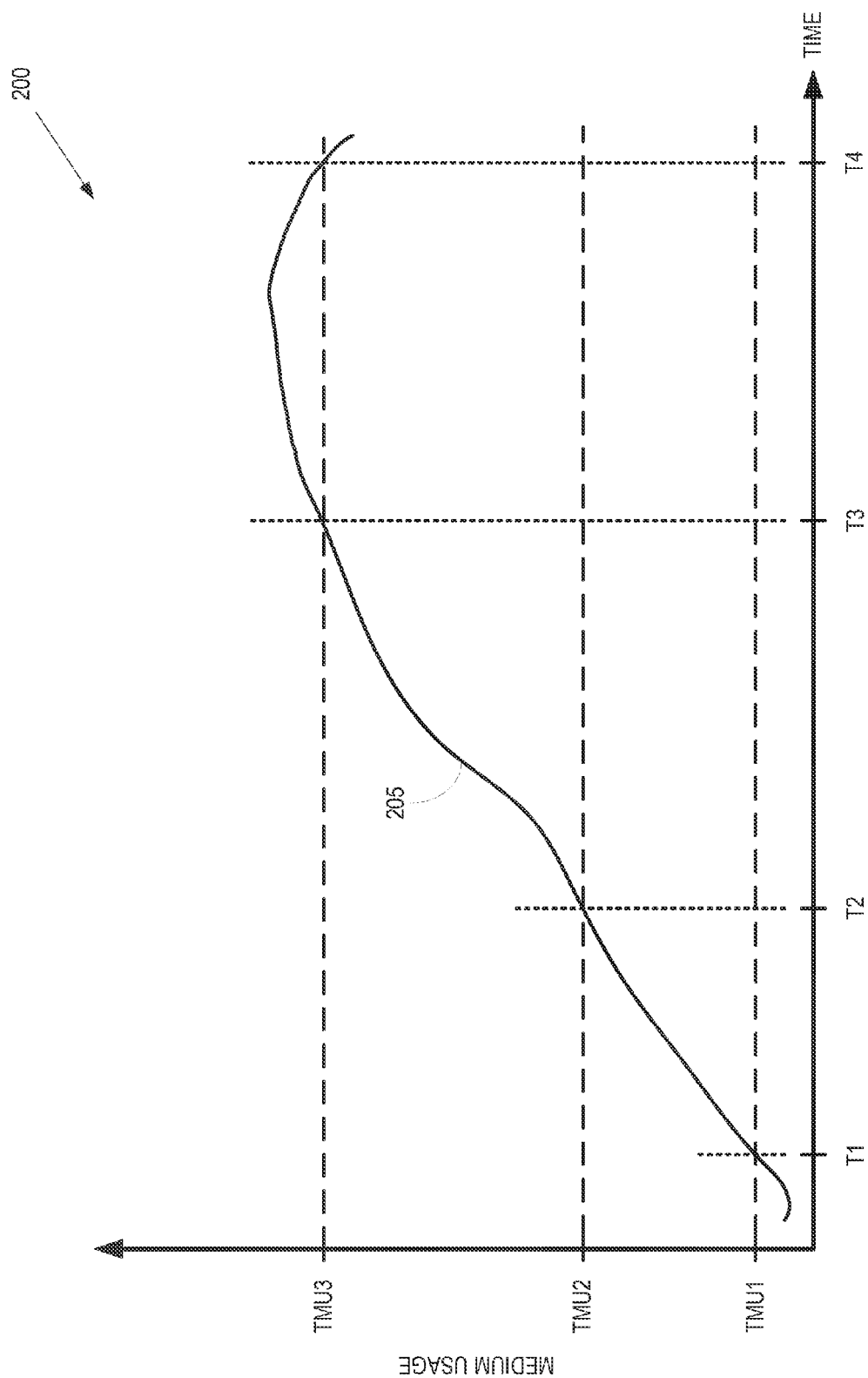
FIG. 2 is a plot showing measured values of a medium usage according to some embodiments.

FIG. 2 is a plot 200 showing measured values of a medium usage 205 according to some embodiments. The vertical axis indicates the medium usage in arbitrary units and the horizontal axis indicates time increasing from left to right. Medium usage may be determined on the basis of measurements of energy received over one or more of the channels for a predetermined time interval, detection of preambles such as Wi-Fi preambles received over the channels, detection of overhead broadcast channels from neighboring nodes, and the like. The plot 200 may correspond to values of the medium usage 205 that are measured by a node such as the node 105 shown in FIG. 1. In the illustrated embodiment, the medium usage 205 is compared to three threshold values (TMU1, TMU2, TMU3). However, some embodiments may use different numbers of threshold values to determine when to modify the durations of silent gaps or other criteria such as a rate of change of the medium usage 205. Furthermore, the specific durations of the silent gaps described below are illustrative examples and some embodiments of the node may use other silent gap durations.

At time $t<T1$, the node measures a value of the medium usage 205 that is less than a first threshold value of the medium usage (TMU1) that corresponds to a clear channel. The node may therefore transmit downlink signals during the ON interval allocated to the node. In some embodiments, the node may also adaptively increase the percentage of the duty cycle allocated to the ON interval in response to detecting the clear channel.

At time $T1<t<T2$, the node measures a value of the medium usage 205 that is greater than the first threshold value (TMU1) but less than a second threshold value (TMU2), which indicates that the node is sharing the channel with one or more other nodes that are attempting to access the channel during the ON interval. Since the measured value of the medium usage 205 is greater than TMU1, the node determines that the ON interval should be punctured to allow downlink transmission by the other nodes. However, the duration of the silent gaps may be relatively low because the medium usage is less than TMU2. For example, the node may introduce silent gaps that have a duration of one millisecond for every 10 ms of ON interval.

At time $T2<t<T3$, the node measures a value of the medium usage 205 that is greater than the second threshold value (TMU2) but less than a third threshold value (TMU3), which indicates that the node is sharing the channel with one or more other nodes that are attempting to access the channel during the ON interval. The increase in the medium usage 205 to a value above TMU2 indicates an increase in the number of attempts to access the channel of the unlicensed frequency band, which may indicate an increased likelihood of performance degradation for the other nodes. The node determines that the silent gaps in the ON interval should be increased to provide increased opportunities for downlink transmission by the other nodes. For example, the node may increase the duration of the silent gaps to 3 ms for every 10 ms of ON interval.

At time $T3<t<T4$, the node measures a value of the medium usage 205 that is greater than the third threshold value (TMU3). The increase in the medium usage 205 to a value above TMU3 indicates another increase in the number of attempts to access the channel of the unlicensed frequency band, which may indicate a further increased likelihood of performance degradation for the other nodes. The node determines that the ON interval should be punctured with longer silent gaps so that the ON interval is evenly partitioned between portions reserved for downlink transmission by the node and portions in which the node bypasses downlink transmission to provide opportunities for the other nodes to transmit information. Some embodiments of the partitioning may include 4 ms or 10 ms silent gaps that alternate with corresponding 4 ms or 10 ms time intervals for downlink transmission by the node. Providing the equal partitioning using silent gaps may correspond to the allocation of time intervals specified by Listen-Before-Talk (LBT) standards.

In some embodiments, the node may increase its overall ON interval to maintain fairness in response to increasing the duration of the silent gaps. For example, the node may increase its overall ON interval from 40 ms to 80 ms when the ON interval is equally partitioned. However, the ON/OFF duty cycle remains the same when the overall ON interval is increased. For example, if the node is sharing the channel of the unlicensed frequency band with two other nodes, the ON/OFF duty cycle may be fixed at 120 ms regardless of whether the overall ON interval of the node is 40 ms or 80 ms.

At time t>T4, the node measures a value of the medium usage 205 that has fallen below TMU3 but remains higher than TMU2. The decrease in the medium usage 205 to a value below TMU3 indicates a decrease in the number of attempts to access the channel of the unlicensed frequency band, which may indicate a decreased likelihood of performance degradation for the other nodes. The node determines that the silent gaps in the ON interval should be decreased in response to the decrease in attempts for downlink transmission by the other nodes. For example, the node may decrease the duration of the silent gaps from equal partitioning to 3 ms for every 10 ms of ON interval.

Figure 3:
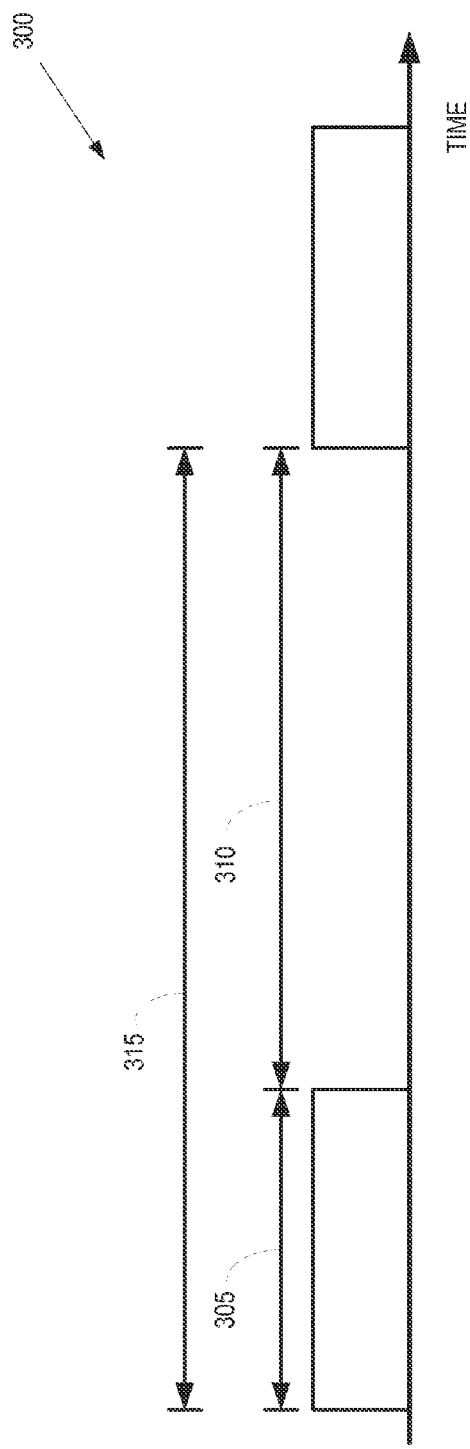
FIG. 3 is a diagram showing allocation of time intervals for downlink transmissions by a node on a channel of an unlicensed frequency band according to some embodiments.

FIG. 3 is a diagram showing allocation 300 of time intervals for downlink transmissions by a node on a channel of an unlicensed frequency band according to some embodiments. The horizontal axis indicates time increasing from left to right. The node operates according to a first RAT (such as LTE) and may be used to implement embodiments of the node 105 shown in FIG. 1. In the illustrated embodiment, the node shares the channel of the unlicensed frequency band with two other nodes that operate according to a second RAT (such as Wi-Fi). The node acquires or reserves the channel for downlink transmissions during an ON interval 305 and bypasses downlink transmissions on the channel during an OFF interval 310. The duty cycle 315 is equal to the sum of the ON interval 305 and the OFF interval 310. For example, the ON interval 305 may be 40 ms and the OFF interval may be 80 ms so that the duty cycle 315 is 120 ms. The duty cycle 315 may repeat indefinitely or for a predetermined amount of time. For example, the duty cycle 315 may be increased in response to additional nodes sharing the channel or decreased in response to one or more nodes ending transmissions over the shared channel.

Figure 4:
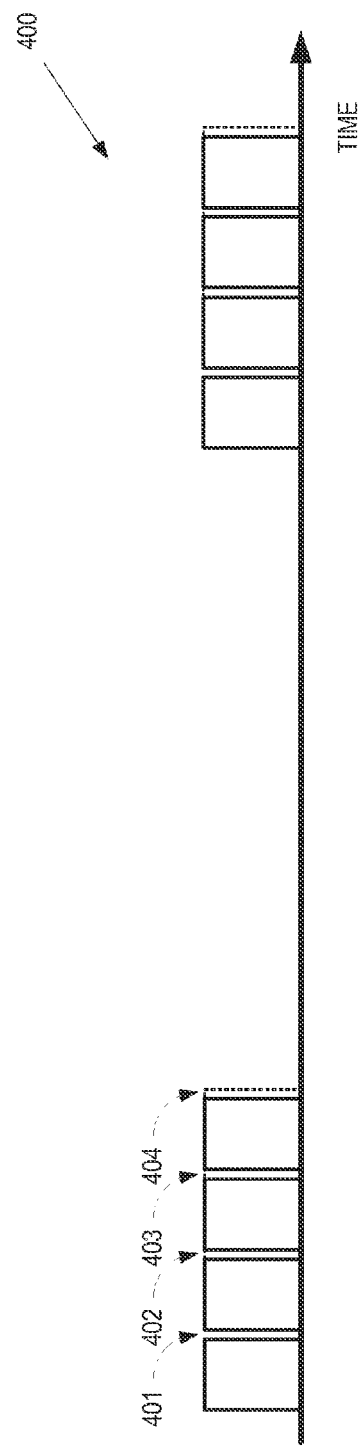
FIG. 4 is a diagram showing allocation of silent gaps in time intervals for downlink transmissions by a node on a channel of an unlicensed frequency band according to some embodiments.

FIG. 4 is a diagram showing allocation 400 of silent gaps in time intervals for downlink transmissions by a node on a channel of an unlicensed frequency band according to some embodiments. The horizontal axis indicates time increasing from left to right. The node may correspond to the node described in FIG. 3. The node operates according to the first RAT and shares the channel of the unlicensed frequency band with two other nodes that operate according to a second RAT. The allocation 400 differs from the allocation 300 shown in FIG. 3 because the ON interval is punctured with silent gaps 401, 402, 403, 404 (which may be referred to as "the silent gaps 401-404"). The duration of the silent gaps 401-404 is determined based on a measurement of medium usage by the nodes that operate according to the second RAT. For example, the silent gaps 401-404 may have a duration of 1 ms for every 10 ms of the ON interval for the node and may therefore correspond to the silent gaps in the time period T1<t<T2 shown in FIG. 2.

FIG. 5 is a diagram showing allocation 500 of silent gaps in time intervals for downlink transmissions by a node on a channel of an unlicensed frequency band according to some embodiments. The horizontal axis indicates time increasing from left to right. The node may correspond to the node described in FIGS. 3 and 4. The node operates according to the first RAT and shares the channel of the unlicensed frequency band with two other nodes that operate according to a second RAT. The node acquires or reserves the channel for downlink transmissions during an ON interval 505 and bypasses downlink transmissions on the channel during an OFF interval 510 over a duty cycle 515. The allocation 500 differs from the allocation 400 shown in FIG. 4 because the ON interval is punctured with longer silent gaps 501, 502, 503, 504 (which may be referred to as "the silent gaps 501-504"). The duration of the silent gaps 501-504 is increased relative to the durations of the silent gaps 401-404 in response to a measurement indicating that the medium usage has increased. For example, the silent gaps 501-504 may have a duration of 3 ms for every 10 ms of the ON interval for the node and may therefore correspond to the silent gaps in the time period T2<t<T3 shown in FIG. 2.

FIG. 6 is a diagram showing allocation 600 of silent gaps that equally partition time intervals for downlink transmissions by a node on a channel of an unlicensed frequency band according to some embodiments. The horizontal axis indicates time increasing from left to right. The node may correspond to the node described in FIGS. 3-5. The node operates according to the first RAT and shares the channel of the unlicensed frequency band with two other nodes that operate according to a second RAT. The node acquires or reserves the channel for downlink transmissions during an ON interval 605 and bypasses downlink transmissions on the channel during an OFF interval 610 over a duty cycle 615. The allocation 600 differs from the allocation 500 shown in FIG. 5 because the ON interval is punctured so that silent gaps 620 are equally partitioned with time intervals 625 for downlink transmission by the node. For example, the duration of the silent gaps 620 may be increased relative to the durations of the silent gaps 401-404 in response to a measurement indicating that the medium usage has increased. The ON interval 605 has also been increased (doubled, in this case) to maintain fairness while maintaining the overall duty cycle 615. For example, the silent gaps 620, 625 may correspond to the silent gaps in the time period T3<t<T4 shown in FIG. 2.

Figure 7:
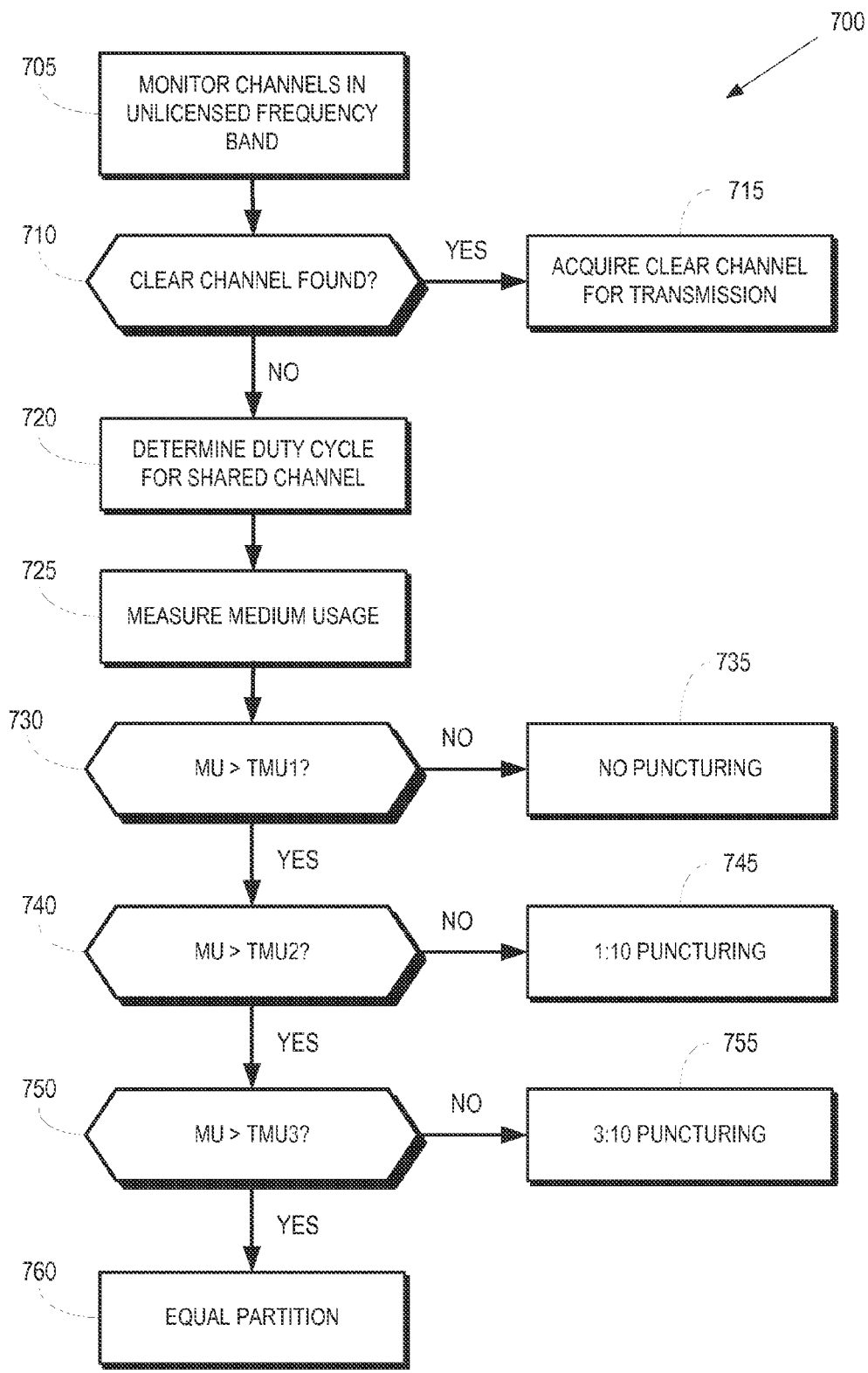
FIG. 7 is a flow diagram of a method for adaptively puncturing time intervals for downlink transmission with silent gaps according to some embodiments.

FIG. 7 is a flow diagram of a method 700 for adaptively puncturing time intervals for downlink transmission with silent gaps according to some embodiments. The method 700 may be implemented in some embodiments of the node 105 shown in FIG. 1. At block 705, the node monitors channels in an unlicensed frequency band, e.g., by monitoring signal strengths, Wi-Fi preambles, overhead channels, and the like. At decision block 710, the node determines whether it has detected a clear channel. If so, the node acquires the clear channel for downlink transmissions at block 715. If not, the node shares the channel with one or more other nodes that operate according to different RATs.

At block 720, the node determines a duty cycle for the shared channel. Some embodiments of the node determine the duty cycle based on the number of nodes that are sharing the channel. For example, if the node is sharing the channel with one other node, the duty cycle includes an ON interval for downlink transmission by the node that utilizes ½ (50%) of the duty cycle and the remaining ½ (50%) of the duty cycle is reserved for the other node. For another example, if the node is sharing the channel with two other nodes, the duty cycle includes an ON interval for downlink transmission by the node that utilizes ⅓ (33%) of the duty cycle and the remaining ⅔ (67%) of the duty cycle is reserved for the other two nodes. Thus, if the node is sharing the channel with N other nodes, the ON interval is equal to a percentage or a fraction 1/(N+1) of the duty cycle.

At block 725, the node measures medium usage of the shared channel by the other nodes that are sharing the channel.

At decision block 730, the node compares the measured medium usage to a first threshold value (TMU1). If the measured medium usage is less than TMU1, the medium usage by the other nodes is low enough and the node determines not to puncture the ON interval with silent gaps at block 735. If the measured medium usage is larger than TMU1, the node determines that the ON interval is to be punctured with silent gaps.

At decision block 740, the node compares the measured medium usage to a second threshold value (TMU2). If the measured medium usage is less than TMU2, the node sets the duration of the silent gaps to 1 ms for every 10 ms of ON interval at block 745. This may be referred to as 1:10 puncturing. If the measured medium usage is larger than TMU2, the node determines that the duration of the silent gaps should be longer than 1:10 puncturing.

At decision block 750, the node compares the measured medium usage to a third threshold value (TMU3). If the measured medium usage is less than TMU3, the node sets the duration of the silent gaps to 3 ms for every 10 ms of ON interval at block 755. This may be referred to as 3:10 puncturing. If the measured medium usage is larger than TMU3, the node determines that the duration of the silent gaps should be longer than 3:10 puncturing. At block 760, the node set the duration of the silent gaps to equally partition the ON interval between silent gaps and time intervals for downlink transmission, as discussed herein.

Figure 8:
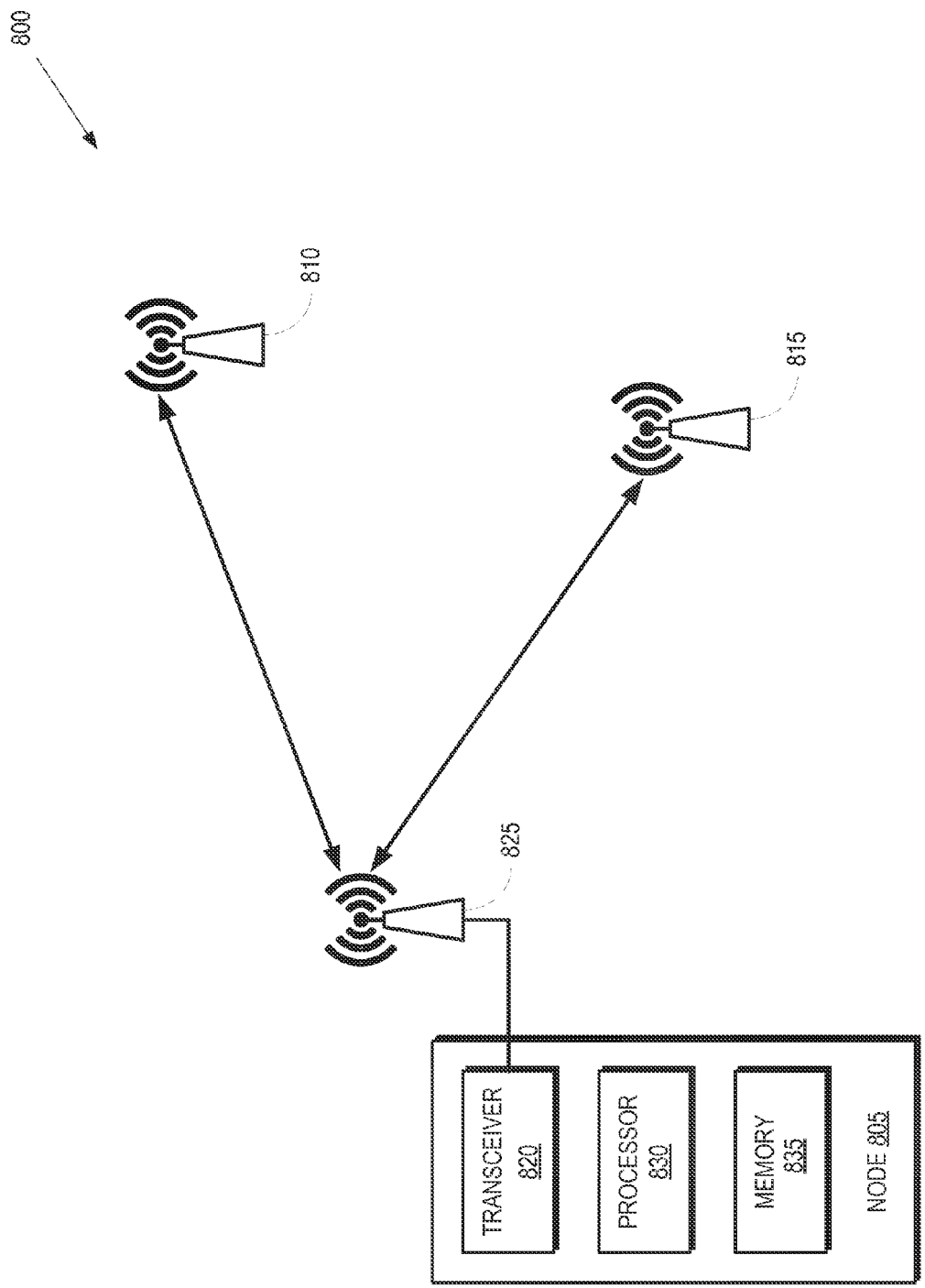
FIG. 8 is a block diagram of a wireless communication system according to some embodiments.

FIG. 8 is a block diagram of a wireless communication system 800 according to some embodiments. The wireless communication system 800 includes a node 805 that operates according to a first RAT and nodes 810, 815 that operate according to a second RAT. Some embodiments of the nodes 805, 810, 815 may correspond to the nodes 105, 110, 115 shown in FIG. 1. As discussed herein, the nodes 805, 810, 815 may share one or more channels of an unlicensed frequency band for downlink transmissions. The node 805 includes a transceiver 820 that is coupled to an antenna 825. The transceiver 820 may transmit messages or signals over downlink channels in the licensed frequency band or supplementary downlink channels in the unlicensed frequency band. The transceiver 820 may also receive signals such as signals transmitted in the unlicensed frequency band by the nodes 810, 815. The node 805 includes memory 830 for storing information such as processor instructions, data for transmission, received data, and the like. A processor 835 may be used to process information for transmission, process received information, or perform other operations as discussed herein, e.g., by executing instructions stored in the memory 830. Some embodiments of the transceiver 820, the memory 830, and the processor 835 may be configured to perform embodiments of the method 700 shown in FIG. 7.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
measuring, at a first node that operates according to a first radio access technology (RAT), a medium usage by at least one second node that operates according to a second RAT, wherein the first node alternately transmits in a first time interval and bypasses transmission in a second time interval, the first and second time intervals repeat with a duty cycle;
puncturing the first time interval with at least one silent gap, wherein a duration of the at least one silent gap is determined based on the medium usage; and
modifying a percentage of the duty cycle allocated to the first time interval in response to changing the duration of the at least one silent gap.

2. The method of claim 1, further comprising:
increasing the duration of the at least one silent gap in response to a measured increase in the medium usage.

3. The method of claim 2, wherein modifying the percentage of the duty cycle comprises increasing the percentage of the duty cycle allocated to the first time interval in response to increasing the duration of the at least one silent gap.

4. The method of claim 2, further comprising:
decreasing the duration of the at least one silent gap in response to a measured decrease in the medium usage.

5. The method of claim 1, further comprising:
comparing the medium usage to at least one threshold; and
determining the duration of the at least one silent gap based on the comparison.

6. The method of claim 5, further comprising:
setting the duration of the at least one silent gap to a first number of subframes in the first time interval in response to the medium usage exceeding a first threshold.

7. The method of claim 6, further comprising:
setting the duration of the at least one silent gap to a second number of subframes in the first time interval in response to the medium usage exceeding a second threshold, wherein the second number is larger than the first number and the second threshold is larger than the first threshold.

8. The method of claim 6, further comprising:
setting the duration of the at least one silent gap to a third number of subframes in response to the medium usage exceeding a third threshold, wherein the third number is larger than the first number and the third threshold is larger than the first threshold, wherein the third number of subframes in the at least one silent gap is equal to a fourth number of subframes in the first time interval that remain available for transmission by the first node.

9. The method of claim 8, wherein modifying the percentage of the duty cycle comprises doubling the percentage of the duty cycle allocated to the first time interval in response to setting the duration of the at least one silent gap equal to the third number of subframes.

10. The method of claim 8, wherein the third number is at least one of a group consisting of four subframes and ten subframes.

11. An apparatus, comprising:
a transceiver that operates according to a first radio access technology (RAT), wherein the transceiver is to measure a medium usage by at least one node that operates according to a second RAT, wherein the transceiver alternately transmits in a first time interval and bypasses transmission in a second time interval, wherein the first and second time intervals repeat with a duty cycle, and wherein the transceiver is to puncture the first time interval with at least one silent gap; and
a processor to determine a duration of the at least one silent gap is based on the medium usage, wherein the processor is to modify a percentage of the duty cycle allocated to the first time interval in response to changing the duration of the at least one silent.

12. The apparatus of claim 11, wherein the processor is to increase the duration of the at least one silent gap in response to a measured increase in the medium usage.

13. The apparatus of claim 12, wherein the processor is to increase a percentage of the duty cycle allocated to the first time interval in response to increasing the duration of the at least one silent gap.

14. The apparatus of claim 12, wherein the processor is to decrease the duration of the at least one silent gap in response to a measured decrease in the medium usage.

15. The apparatus of claim 11, wherein the processor is to compare the medium usage to at least one threshold and determine the duration of the at least one silent gap based on the comparison.

16. The apparatus of claim 15, wherein the processor is to set the duration of the at least one silent gap to a first number of subframes in the first time interval in response to the medium usage exceeding a first threshold.

17. The apparatus of claim 16, wherein the processor is to set the duration of the at least one silent gap to a second number of subframes in the first time interval in response to the medium usage exceeding a second threshold, wherein the second number is larger than the first number and the second threshold is larger than the first threshold.

18. The apparatus of claim 16, wherein the processor is to set the duration of the at least one silent gap to a third number of subframes in response to the medium usage exceeding a third threshold, wherein the third number is larger than the first number and the third threshold is larger than the first threshold, wherein the third number of subframes in the at least one silent gap is equal to a fourth number of subframes in the first time interval that remain available for transmission by the transceiver.

19. The apparatus of claim 18, wherein the processor is to double a percentage of the duty cycle allocated to the first time interval in response to setting the duration of the at least one silent gap equal to the third number of subframes.

20. The apparatus of claim 18, wherein the third number is at least one of a group consisting of four subframes and ten subframes.

* * * * *